Dec. 10, 1968     S. D. POOL ETAL     3,415,040
CONTROL FOR CLEANING AIR SCREEN
Filed Oct. 31, 1966     2 Sheets-Sheet 1

Inventors
Stuart D. Pool
Arnold Zimmerman

Dec. 10, 1968  S. D. POOL ETAL  3,415,040
CONTROL FOR CLEANING AIR SCREEN
Filed Oct. 31, 1966  2 Sheets-Sheet 2

Inventors:
Stuart D. Pool
Arnold Zimmerman
By F. David AuBuchon Atty

United States Patent Office 3,415,040
Patented Dec. 10, 1968

3,415,040
CONTROL FOR CLEANING AIR SCREEN
Stuart D. Pool, Naperville, and Arnold Zimmerman, Downers Grove, Ill., assignors to International Harvester Company, Chicago, Ill., a corporation of Delaware
Filed Oct. 31, 1966, Ser. No. 590,962
6 Claims. (Cl. 55—283)

ABSTRACT OF THE DISCLOSURE

An air screening device having means for automatically interrupting the air flow through the screen, to thereby release dust particles that have collected on the windward side of the screen. The means for interrupting the air flow is energized in response to a pressure sensitive device that senses a reduction in air pressure on the leeward side of the screen when the screen becomes blocked by dust particles.

---

The present invention relates to a control for cleaning the air-screen of a radiator and more particularly to a device that will clear the air-screen automatically in response to a decrease in air pressure within the air chute.

The radiator air-screen for machines such as combines that work in dusty or chaffy conditions tend to clog and cause overheating of the engines. The debris laden air is pulled through the air screen and then directed over the engine to cool it. The dust and chaff in the air collects on the outer surface of the air-screen and eventually builds up to a point where the screen is blocked. In order to clear the air-screen it is necessary to stop the air flow so that the chaff and dust will fall off the screen. In the past when the operator noticed a rise in the engine temperature, he would stop the engine and thus stop the air flow permitting the dust and chaff to fall from the screen. Another solution was to provide a baffle within the air screen that could be manually positioned such that it would choke off the flow of air through the screen to thus permit the chaff and dust to fall. Reference may be made to the Lundberg Patent No. 2,376,546 of May 22, 1945, for a device such as this. Still another solution to this problem has been the provision of means for reversing the rotation of the fan to thus create an air flow in the opposite direction which will clear the chaff and dust from the air-screen. Reference may be made to the Nicholson et al. Patent No. 3,202,144 of Aug. 24, 1965 for a device such as this. Each of these solutions however require constant vigilance by the operator and when he fails to act in time, the excessive engine heat can cause considerable damage. Furthermore, stopping the engine creates "lost time" which is undesirable.

The general purpose of this invention is to provide an automatic control for cleaning radiator air-screens which embraces all of the advantages of similarly employed cleaning devices and possesses none of the aforedescribed disadvantages. To attain this, the present invention contemplates the use of a pressure sensitive device that will monitor the air pressure within the air chute and will cycle the automatic cleaner in response to a predetermined reduction in air pressure. It has been found that when the air-screen of a combine is completely clogged, the vacuum measures about three inches of water. Since it is undesirable to continue operations until the air-screen is completely clogged, for this combine, a pressure sensitive device that would actuate a microswitch in response to a vacuum of one to two inches of water would be used.

An object of the present invention is the provision of an automatic device that will release the accumulation of debris held on the exposed surface of an air-screen when required.

Another object is to provide a pressure sensitive device that will monitor the air pressure within the air-chute of an air-screen and actuate means for cleaning the air-screen when the pressure falls a predetermined amount.

A further object is to provide a baffle within an air chute that is moved to a position that will choke off the flow of air through the air-chute in response to a decrease in air pressure within the air-chute.

Still another object is to provide means for reversing the direction of air flow through the air-screen in response to a decrease in air pressure within the air-chute.

These and other objects of the invention will become more apparent from the specification and drawings, wherein.

Figure 1:
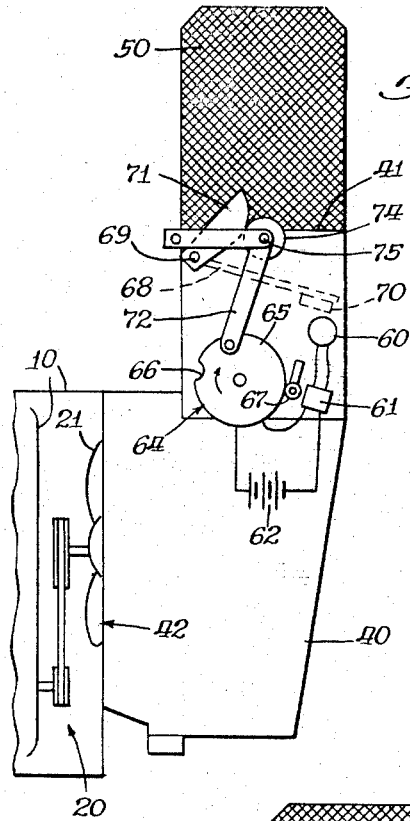
FIGURE 1 is a side view of one embodiment of the radiator air-screen cleaner.
Figure 2:
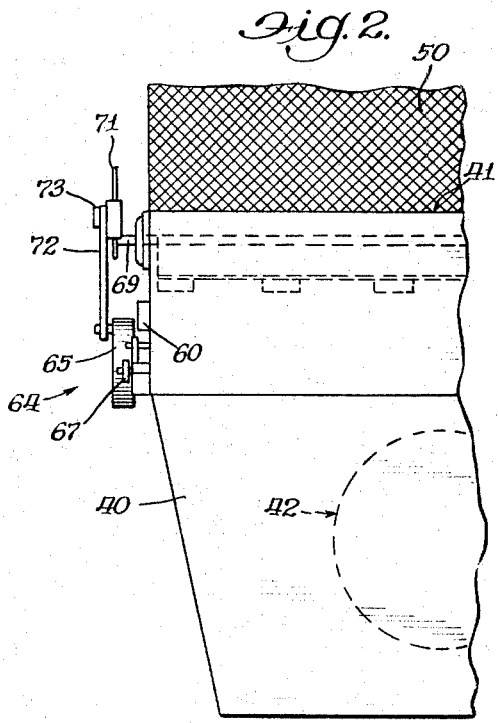
FIGURE 2 is a partial front view of the radiator air-screen cleaner shown in FIGURE 1.

Referring now to the drawings, wherein like reference characters designate like or corresponding parts throughout the several views, there is shown in FIGURES 1 and 2 a first embodiment of applicants' invention. There is shown in FIGURE 1, a support means designated 10 upon which the fan means 20 and air-chute 40 are mounted. The air-chute 40 is in the form of a sheet metal conduit having a first opening designated 41 and a second opening designated 42. An air-screen 50 completely covers the first opening 41 of the air-chute. The air-screen 50 has a generally box shape with vertical sides from which the chaff and dust will fall by gravity when the normal air stream is stopped or reversed.

A horizontal pivot pin 69 is journalled in the walls of air-chute 40. A plate-type baffle 68 is secured to the pivot pin 69 along a first edge and carries a plurality of weights 70 along another edge spaced from said first edge.

The fan means 20 normally creates a stream of air flowing through the air screen 50 into the air-chute 40 through the first opening 41 and out the air-chute 40 through the second opening 42. When the plate-type baffle 68 is in the position indicated in FIGURE 1, this normal flow of air is choked off by the baffle and there is no air flowing through the air-screen 50. The plate-type baffle 68 can also be positioned such that its plane is generally parallel to the flow of the air stream and in this position presents no obstruction to the normal flow of air. When it is necessary to remove the chaff and dust from the air-screen 50, the plate-type baffle 68 is moved into the position shown in FIGURE 1 and the debris is permitted to fall from the vertical walls of the air-screen 50.

The pivot pin 69 has a free end portion located exteriorly of the air-chute 40 upon which there is mounted a cam 71. The cam 71 is engaged by a cam follower 74 to thus cause the baffle 68 to be moved from one position to the other.

An electric powered drive member 64 is mounted on the air-chute 40 on a side adjacent the cam 71. The drive member 64 includes a disc 65 having a notch 66 formed along the peripheral edge. A first link 72 is pivotally connected at one end to the disc 65 and is connected at its other end by a pivot pin 75 to a second link 73. The pivot pin 75 also functions to rotatably mount the cam follower 74. The free end of second link 73 is pivotally mounted on the side of air-chute 40.

A pressure sensitive means 60 is carried by the air-chute 40. The pressure sensitive means is exposed to the interior of the air-chute and is in the form of a diaphragm having an associated microswitch. The pressure sensitive means 60 is connected by wires to a first switch or solenoid 61 which is shown mounted on the side of the air-chute 40. The pressure sensitive means 60, in response to a predetermined decrease of air pressure within the air-chute, actuates the solenoid 61 which closes the normally open electrical circuit. The electric drive member 64 and the battery designated 62 are included in this electrical circuit. A cam switch 67, having a portion corresponding in shape to the notch 66, is carried on the air-chute 40. When the cam switch 67 moves into the notch 66, the normally open switch controlled by solenoid 61 is mechanically opened. When the cam switch 67 is not nested in the notch 66 and is in engagement with the peripheral surface of disc 65, then the normally open switch controlled by solenoid 61 is mechanically held closed.

The embodiment of radiator air-screen cleaner shown in FIGURES 1 and 2 operates as follows. Under normal conditions, the fan means 20 is pulling air through the air-screen 50 into the air-chute 40 through the first opening 41 and out the second opening 42. During this normal flow, the baffle 68 is positioned such that its plane is parallel to the direction of flow and creates no obstruction to the air flow. When the debris on the outer surface of the air-screen 50 has built up sufficiently to cause a predetermined decrease in air pressure within the air-chute 40, this decrease in air pressure is sensed by the pressure sensitive means 60 causing the solenoid 61 to be actuated. At this time, the cam switch 67 is nested in the notch 66 formed in the disc 65. Upon actuation of the solenoid 61, the drive member 64 begins to rotate the disc 65 in a clockwise direction as seen in FIGURE 1. Rotation of the disc 65 causes the cam follower 74 to move along the cam 71; which, through its connection by pivot pin 69 to the plate-type baffle 68, causes the baffle to be moved into the position shown in FIGURE 1 where it chokes off the flow of air through the air-screen 50. When there is no longer a flow of air through the air-screen 50, the debris adhering to the vertical side walls of the air-screen 50 falls by gravity from the screen. When the drive member 64 has rotated the disc 65 one complete rotation, the cam switch 67 again seats itself in the notch 66 and electrical circuit to the drive member 64 is opened. The switch in the electrical circuit controlled by the solenoid 61 will remain open until the pressure sensitive means 60 again energizes the solenoid 61 and the cycle is then repeated.

Figure 3:
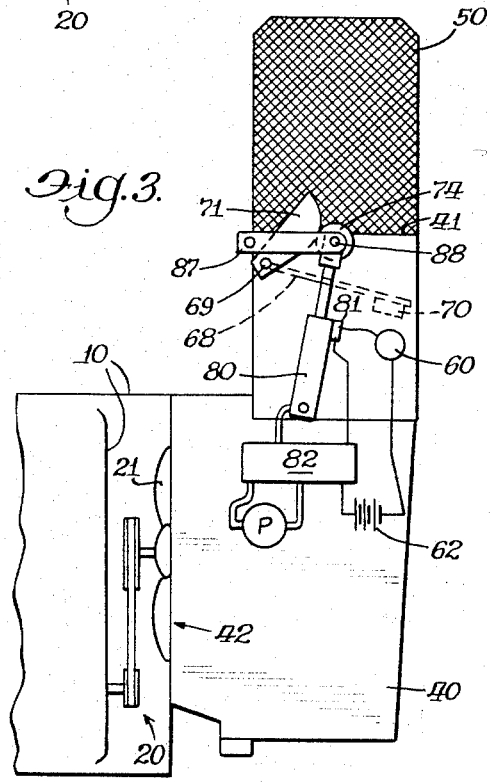
FIGURE 3 is a side view of a second embodiment of the radiator air-screen cleaner.
Figure 4:
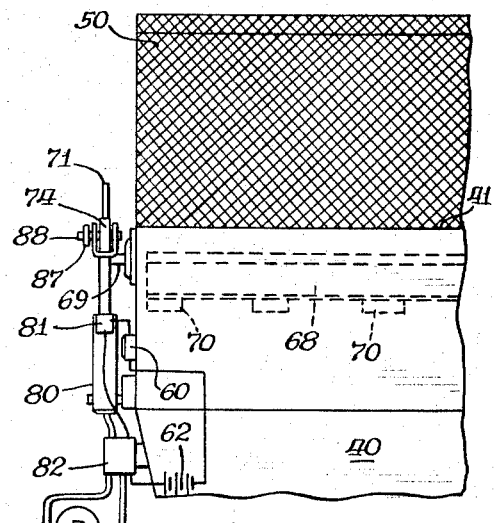
FIGURE 4 is a partial front view of the radiator air-screen cleaner as shown in FIGURE 3.

Referring now to FIGURES 3 and 4 wherein a second embodiment of applicants' radiator air-screen cleaner is illustrated, in which a plate-type baffle 68 controlled by a cam 71 is likewise used to choke off the flow of air through the air-screen 50. A hydraulic jack 80 is pivotally mounted at its head end on the air-chute 40 adjacent the cam 71. A link 87 is pivotally connected to the free end of the piston by a pivot pin 88 and the other end of the link is pivotally connected to the air-chute 40. The cam follower 74 is mounted for rotation on the pivot pin 88. The hydraulic jack 80 has a limit switch 81 mounted thereon that is normally closed and is designed to open the electrical circuit when the hydraulic jack has been expanded to its extreme length. The hydraulic jack 80 receives its hydraulic fluid from a solenoid actuated, two position, hydraulic valve 82. The valve 82 directs hydraulic fluid to jack 80 when the solenoid is energized and is returned to the neutral position by a spring when the solenoid is de-energized. A pump P supplies fluid under pressure to the valve 82. The pressure sensitive means 60 is of the same type described previously and is connected in an electric series circuit with the limit switch 81, the solenoid actuated valve 82 and a battery 62.

The embodiment of the radiator air-screen cleaner shown in FIGURES 3 and 4 operates as follows. Under normal conditions, the plane of the plate-type baffle 68 will be positioned such that it is parallel to the flow of air through the air-screen 50 and the air-chute 40. When the debris on the outer surface of the air-screen 50 has built up to a point where there is a predetermined decrease in air pressure within the air-chute 40, the pressure sensitive means 60 will be actuated. An impulse will be transmitted along the electrical circuit through the normally closed limit switch 81 and will actuate the solenoid of the valve 82. Upon actuation of the solenoid of valve 82, hydraulic fluid under pressure from the pump P will be directed through the valve 82 into the head end of the hydraulic jack 80. This will cause the hydraulic jack to expand, moving the cam follower 74 along the cam 71 and thereby positioning the baffle 68 such that it will choke off the flow of air through the air-screen 50. When the air-screen is thus choked off, the debris adhering to the vertical surfaces of the air-screen will fall away by gravity. When the hydraulic jack 80 has reached its extreme length, the limit switch 81 is encountered and the electrical circuit is opened. Upon opening the electrical circuit, the solenoid of valve 82 is de-energized and the hydraulic valve is returned by a spring to the neutral position. In this position, the fluid from the cylinder is permitted to drain out and the weights 70 cause the baffle 68 to return to its position where it will not obstruct the flow of air through the air-chute 40 and air-screen 50. The baffle 68 remains in this position until the pressure sensitive means 60 is again energized and the cleaning cycle is repeated.

Figure 5:
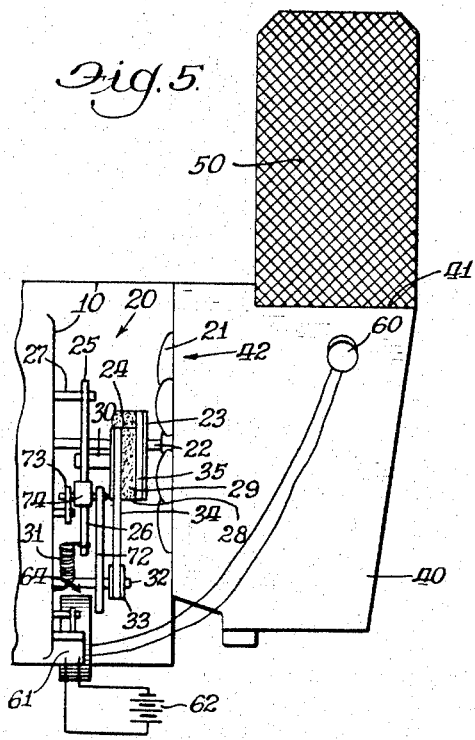
FIGURE 5 is a side view of a third embodiment of the radiator air-screen cleaner.
Figure 6:
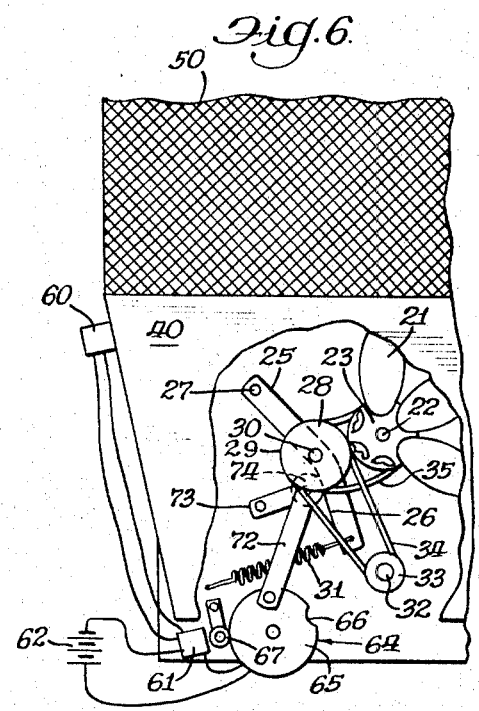
FIGURE 6 is a partial front view of the radiator air-screen cleaner as shown in FIGURE 5.

Referring now to FIGURES 5 and 6 wherein a third embodiment of the radiator air-screen cleaner is disclosed. In the embodiment disclosed in FIGURES 5 and 6, a fan reversing mechanism is utilized. Under normal conditions, the fan blade 21 is drawing air from the atmosphere through the air-screen 50 into the air-chute 40 through the first opening 41 and out the air-chute 40 through the second opening 42. In this embodiment of applicants' invention, when the air-screen 50 becomes clogged with chaff and debris, the direction of rotation of the fan blade is reversed causing a stream of air to flow into the air-chute 40 through the second opening 42 and out the first opening 41 and then through the air-screen from the interior outwardly to the atmosphere.

The fan means 20 for accomplishing this reversal of flow includes the fan blade 21 mounted on a shaft 22 that is journalled in the support 10. The shaft 22 also has secured thereto a first sheave 23 and includes a friction surface 24 over a portion of its peripheral edge. An elongated arm 25 having a cam surface designated 26 is mounted on the support 10 at one end by a pivot pin 27. A second sheave 28 is supported on the arm 25 by a shaft 30. The second sheave 28 has grooves for receiving two belts and also a friction surface designated 29. A spring 31 connected at one end to the free end of arm 25 and anchored at its other end in the support 10 tends to pivot the arm 25 and second sheave 28 in a direction away from first sheave 23. The first and second sheaves are mounted such that their friction surfaces 24 and 29 respectively will engage when the arm 25 is pivoted in the direction opposed by the spring 31. A drive shaft 32 is journalled in the support 10 and has mounted thereon a pinion sheave 33. A first belt 34 connects the pinion sheave 33 to the second sheave 28 and a second belt 35 connects the second sheave 28 to the first sheave 23.

The drive member 64 disclosed in FIGURES 5 and 6 for cycling the cam follower 74 is identical to that disclosed in FIGURES 1 and 2 and thus a detailed description of this mechanism will not be repeated.

Figure 8:
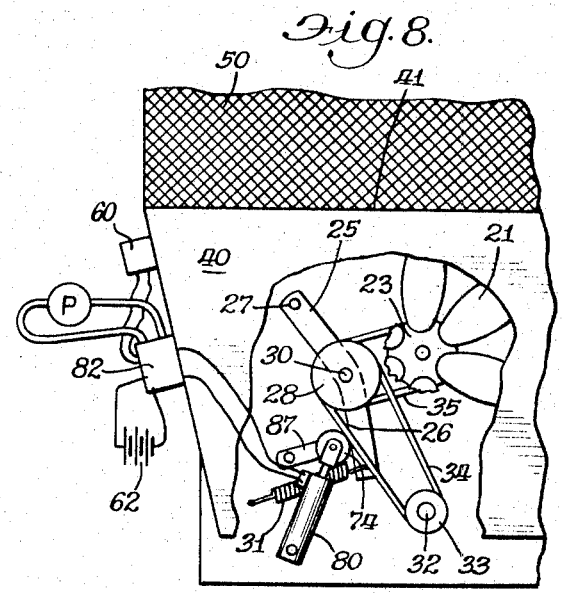
FIGURE 8 is a partial front view of the radiator air-screen cleaner as shown in FIGURE 7.

The embodiment of radiator air-screen cleaner disclosed in FIGURES 5 and 6 operates as follows. When the air-screen 50 has accumulated sufficient debris on its outer surface to cause a predetermined drop in the air pressure within the air-chute, the pressure sensitive means 60 is energized. This sends an impulse through the electrical circuit to the first switch or solenoid 61 which in turn actuates the drive member 64. Actuation of the drive member 64 causes disc 65 to rotate and unseats the cam switch 67 from the notch 66. The cam follower 74 connected to the joint of the first and second links 72 and 73 rides up the cam surface 26 of arm 25 moving the second sheave 28 towards the first sheave 23. As these sheaves approach each other, the tension in the second belt 35 is relaxed and drive is no longer transmitted from the second sheave to the first sheave through the belt 35. When the second sheave engages the first sheave through the friction surfaces 29 and 24 respectively, drive is then transmitted to the first sheave 23. When the first sheave 23 is being rotated through the engagement of the friction surface 24 and 29, it is being rotated in a direction opposite to its normal direction of rotation. This can be best appreciated by comparing FIGURES 6 and 8. In FIGURE 6, first sheave 23 is being driven in one direction through the action of the friction surfaces 24 and 29 and in FIGURE 8, first sheave 23 is being driven in the opposite direction through the action of the second belt 35. When the disc 65 has completed one revolution, the cam switch 67 falls into notch 66 which opens the electrical circuit and thus de-energizes the drive means 64. At this point, the cam follower 74 has returned to the position relative to the arm 25 as shown in FIGURE 8 and the first and second sheaves 23 and 28 respectively are again drivingly connected by the second belt 35. Thus at this point, the fan blades 21 are again rotating in their normal direction and pulling a stream of air through the air-screen 50 into the air-chute 40 through the first opening 41 and out through the second opening 42.

Figure 7:
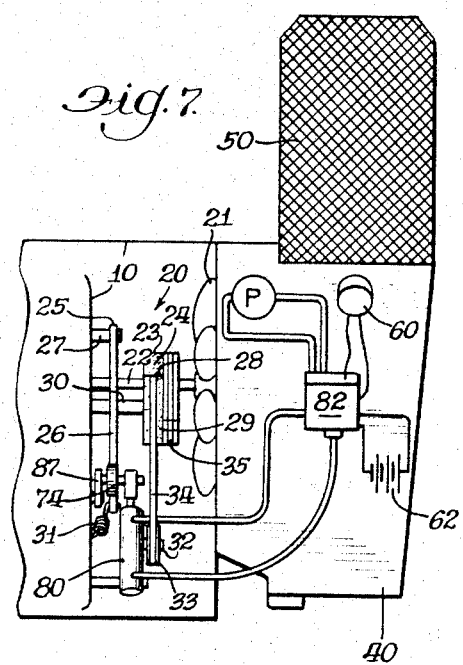
FIGURE 7 is a side view of a fourth embodiment of the radiator air-screen cleaner.

A fourth embodiment of the radiator air-screen is shown in FIGURES 7 and 8. In this embodiment, fan reverse means of the same type discussed above with respect to FIGURES 5 and 6 are utilized. However, a hydraulic jack 80 rather than a one revolution drive member 64 is utilized as the means for pivoting the arm 25. The hydraulic jack 80 utilized in the embodiment shown in FIGURES 7 and 8 is the same as the hydraulic jack described above with reference to FIGURES 3 and 4.

The embodiment of the air-screen cleaner disclosed in FIGURES 7 and 8 operates as follows. When the air-screen 50 becomes covered with chaff and debris, there is a decrease in air pressure within the air-chute 40. This decrease in air pressure is sensed by the pressure sensitive means 60 which sends an electrical impulse to the solenoid or the valve 82. The energized solenoid opens the passage through valve 82 to permit hydraulic fluid under pressure to flow from the pump P to the head end of the hydraulic jack 80 causing it to expand. As the hydraulic jack 80 expands, cam follower 74 rides up the cam surface 26 causing slack in the second belt 35 and engagement of the friction surfaces 24 and 29. With these friction surfaces in engagement, the fan blade 21 is driven in a direction reverse to its normal direction and clears the debris that is blocking the air-screen 50. When the hydraulic jack 80 reaches its fully expanded length, the limit switch 81 is engaged and the electrical circuit is opened. With the electrical circuit broken, the solenoid of valve 82 is de-energized and the valve is returned to the neutral position by a spring. This permits the hydraulic jack 80 to contract to its shortest length and the driving relationship between the second sheave 28 and first sheave 23 through the second belt 35 is re-established. When the air-screen 50 is again blocked causing actuation of the pressure sensitive means 60, the cleaning cycle is repeated.

It should be understood, of course, that the foregoing disclosure relates to only preferred embodiments of the invention and that numerous modifications or alterations may be made therein without departing from the spirit or scope of the invention as set forth in the appended claims.

What is claimed is:

1. A screening device for engine cooling air comprising:
   an air-chute having first and second openings spaced from each other,
   an air-screen connected to said air-chute and covering said first opening,
   fan means located adjacent said second opening and adapted to create a stream of air through said air-chute and air-screen flowing in the direction from said first opening toward said second opening,
   pressure sensitive means adapted to sense a change in air pressure within said air-chute,
   a first switch connected to said pressure sensitive means and actuated thereby in response to a decrease in air pressure within said air-chute,
   control means operative in response to said first switch to block said stream of air through said air-screen,
   said control means being movable between air flow blocking and air flow transferring positions by a hydraulic jack, the length of said jack being variable between an extreme contracted and an extreme extended length, said jack adapted to change in length from a first extreme length to the other extreme length in response to actuation of said first switch,
   a limit switch associated with said jack such that it is actuated when said jack assumes said other extreme length in response to actuation of said first switch,
   and said limit switch upon actuation operative to cause said jack to return to said first extreme length.

2. The invention as set forth in claim 1 wherein a plate-type baffle, connected to said hydraulic jack is mounted within said air-chute for movement between a first position at which the plane of said plate-type baffle is substantially parallel to the direction of said stream of air and thus does not encumber its flow and a second position at which the plane of said plate-type baffle is substantially normal to the direction of said stream of air and thus chokes the flow.

3. A screening device for engine cooling air comprising:
   a support,
   an air-chute having first and second openings spaced from each other,
   an air-screen connected to said air-chute and covering said first opening,
   fan means located adjacent said second opening and adapted to create a stream of air through said air-chute and air-screen flowing in the direction from said first opening toward said second opening,
   pressure sensitive means adapted to sense a change in air pressure within said air-chute,
   a first switch connected to said pressure sensitive means and adapted to be actuated thereby in response to a decrease in air pressure within said air-chute,
   control means operative in response to said first switch to cut off said stream of air through said air-chute and air-screen,
   said fan means including a fan blade connected to a first sheave, said first sheave mounted for rotation on said support, said first sheave having a frictional surface along its outer peripheral edge,
   an arm pivotally mounted on said support about a point adjacent said first sheave, a second sheave rotatably mounted on said arm, said second sheave having a friction surface along the outer peripheral edge, said arm and second sheave being mounted such that upon pivotal movement of said arm the friction surfaces of said first and second sheaves can be engaged, spring means for biasing said arm and second sheave away from said first sheave.

a drive shaft having a pinion sheave mounted thereon, a first belt coupling said first sheave to said second sheave, a second belt coupling said pinion sheave to said second sheave, said control means connected to said arm and operative to pivot said arm in opposition to said spring means in response to said first switch.

4. The invention as set forth in claim 3 wherein said arm includes a cam surface and said control means further includes a cam follower adapted to engage said cam surface and cause pivotal movement of said arm.

5. A screening device for engine cooling air comprising:
a support,
an air-chute having first and second openings spaced from each other,
an air-screen connected to said air-chute and covering said first opening,
fan means located adjacent said second opening and adapted to create a stream of air through said air-chute and air-screen flowing in the direction from said first opening toward said second opening,
pressure sensitive means adapted to sense a change in air pressure within said air-chute,
a first switch connected to said pressure sensitive means and adapted to be actuated thereby in response to a decrease in air pressure within said air-chute,
control means operative in response to said first switch to cut off said stream of air through said air-chute and air-screen,
said control means including a drive member that will revolve one revolution in response to the actuation of said first switch,
said fan means including a fan blade connected to a first sheave, said first sheave mounted for rotation on said support, said first sheave having a frictional surface along its outer peripheral edge,
an arm pivotally mounted on said support about a point adjacent said first sheave, a second sheave rotatably mounted on said arm, said second sheave having a friction surface along the outer peripheral edge,
said arm and second sheave being mounted such that upon pivotal movement of said arm the friction surfaces of said first and second sheaves can be engaged, spring means for biasing said arm and second sheave away from said first sheave,
a drive shaft having a pinion sheave mounted thereon,
a first belt coupling said first sheave to said second sheave,
a second belt coupling said pinion sheave to said second sheave,
said control means connected to said arm and operative to pivot said arm in opposition to said spring means in response to said first switch.

6. The invention as set forth in claim 5 wherein said arm includes a cam surface and said control means further includes a cam follower adapted to engage said cam surface and cause pivotal movement of said arm.

References Cited

UNITED STATES PATENTS

| | | | |
|---|---|---|---|
| 2,376,546 | 5/1945 | Lundberg | 55—268 |
| 2,455,734 | 12/1948 | Clausen | 55—268 X |
| 2,500,268 | 3/1950 | Adams | 55—505 |
| 2,633,206 | 3/1953 | Bruckner | 55—283 X |
| 2,848,064 | 8/1958 | Gregory et al. | 55—352 X |
| 2,886,016 | 5/1959 | Ashton | 55—282 X |
| 2,896,594 | 7/1959 | Ashton | 55—282 X |
| 3,087,563 | 4/1963 | Fisher | 55—288 X |
| 3,097,936 | 7/1963 | Lincoln | 55—302 X |

FOREIGN PATENTS 762,598  11/1956  Great Britain.

HARRY B. THORNTON, *Primary Examiner.*

BERNARD NOZICK, *Assistant Examiner.*

U.S. Cl. X.R.

55—302, 505, 467